United States Patent

[11] 3,592,443

| [72] | Inventors | Jack C. Budrow;<br>Glenn A. Reed, both of Battle Creek, Mich. |
|---|---|---|
| [21] | Appl. No. | 845,698 |
| [22] | Filed | July 29, 1969 |
| [45] | Patented | July 13, 1971 |
| [73] | Assignee | H & H Engineering Division<br>Battle Creek, Mich. |

[54] ELECTRIC JACK
8 Claims, 9 Drawing Figs.

[52] U.S. Cl. .................................................. 254/86,
 64/29
[51] Int. Cl. ............................................... B60s 9/08
[50] Field of Search ........................................... 254/103,
 86, DIG. 2; 64/29

[56] References Cited
UNITED STATES PATENTS
2,655,340  10/1953  Dalton.......................... 254/86

| 2,659,466 | 11/1953 | Dalton.......................... | 254/103 |
| 2,983,121 | 5/1961 | Naas............................. | 64/29 |
| 3,151,707 | 10/1964 | Dalton.......................... | 254/86 X |
| 3,288,435 | 11/1966 | Starkey ....................... | 254/86 |

*Primary Examiner*—Robert C. Riordon
*Assistant Examiner*—Roscoe V. Parker, Jr.
*Attorney*—Beaman & Beaman

ABSTRACT: A jack powered by a reversible electric motor preferably for use with trailers for the support of the trailer tongue. The jack includes a column telescopically received within a supporting tube utilizing a threaded shaft and nut system to extend the column. The electric motor is connected to the shaft by means of a speed-reducing transmission incorporating a slip clutch responsive to predetermined torque operative upon the column reaching its extremes of movement to prevent stalling and stressing the motor and transmission.

INVENTORS
JACK C. BUDROW
GLENN A. REED
BY
ATTORNEYS

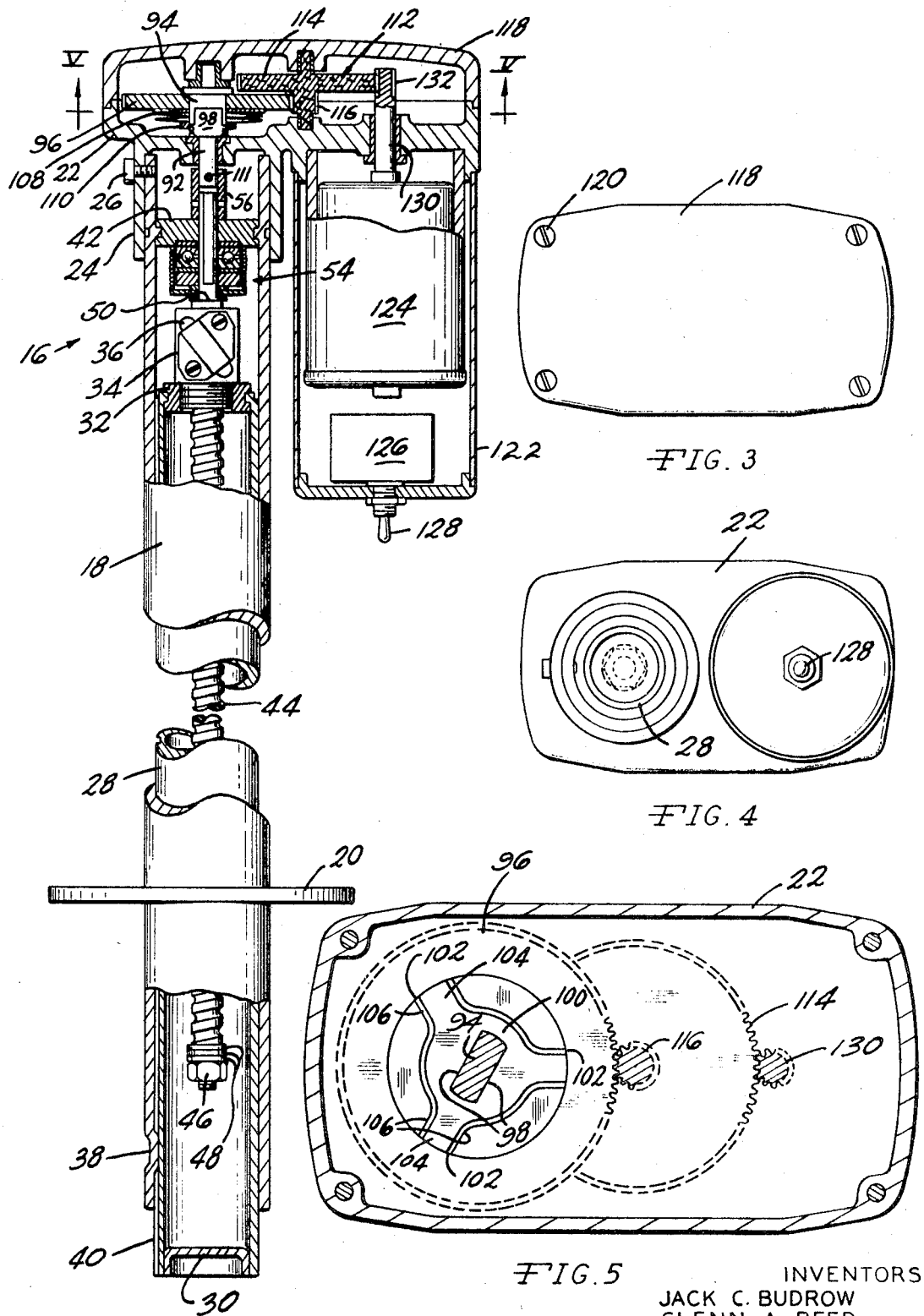

ELECTRIC JACK

BACKGROUND OF THE INVENTION

The invention pertains to the field of electrically powered jacks using a threaded shaft and nut to produce relative movement between the jack components.

The recreational vehicle trailer art has progressed rapidly in recent years, and a wide variety of recreational vehicles adapted to be towed by automobiles and trucks are available to the public. As the size and weight of such travel trailers increases the handling of the trailer becomes more difficult, and in particular, hitching and unhitching of the trailer to the towing vehicle can become very difficult, particularly if assistance is not available during a hitching procedure. In that it is usually necessary to level the trailer during use, and vertically align the trailer hitch with the vehicle hitch when connecting the trailer to the vehicle, the vertical orientation of the trailer is important, and must be adjusted often. It is common practice to vertically adjust the tongue of the trailer whenever the trailer is parked and in use, and it is known to incorporate a manually operated jack into the tongue for this purpose. However, due to the weight of the trailer considerable manual effort must be expended to raise the trailer tongue when employing a manual jack.

Electrically powered jacks for use with recreational trailers are available, one device for adapting a manual jack to electric operation being shown in U.S. Pat. No. 3,288,435. However, the complexity of the switching mechanism to terminate operation of this type of jack at the limits of its movement, and other constructional details, render such electrically powered jacks expensive and susceptible to malfunctioning. In that a recreational vehicle jack is infrequently used, usually only being used in the summer and vacation periods, it is necessary that the construction be such as to resist corrosion and "-setting up" during periods of inactivity. Additionally, the operation of the jack must be simple as to permit operation by unskilled operators, and the jack must be readily mountable upon existing travel trailers. Prior art devices have not adequately met the above requisites for this type of apparatus.

SUMMARY OF THE INVENTION

It is a purpose of the invention to provide an electrically powered jack which may be used to advantage to raise and lower the tongues of trailers and the like which is of a relatively inexpensive construction, and employs a simplified arrangement of components to minimize maintenance and potential problems.

A further object of the invention is to provide an electrically powered jack utilizing a reversible, direct current motor connected to a threaded shaft for the rotation of the shaft, wherein the rotation of the shaft extends or retracts a jack column, and upon the column reaching the limits of its movement a torque-responsive slip clutch incorporated in the transmission between the motor and the threaded shaft prevents stalling of the motor and overheating and overstressing of the motor and transmission components. The use of the torque-limiting device eliminates the need for limit switches or the like, permitting a simple manually operated switch to be employed.

In the practice of the invention a support member in the form of a tube telescopically receives a tubular column which may be retracted or extended with respect to the support member. A threaded shaft coaxially extends through the support member and column, and the column has an antifriction nut affixed thereto for cooperation with the threaded shaft. The electric motor is connected to the threaded shaft by a transmission system, which includes the torque-limiting clutch, and the motor and transmission are affixed to the upper end of the support member tube. The relationship of the components is such as to produce a clean and simplified construction occupying relatively little space, and readily mountable upon the tongue of a trailer.

An additional purpose of the invention is to provide an electric jack utilizing a reversible electric motor and transmission unit which may be removed from the extensible portions of the jack in the event of an electric power failure wherein manual crank means may be used to extend the jack for raising and lowering purposes.

In order to reduce the power requirements an antifriction nut is used with the threaded shaft of the jack, and in order to prevent the weight of the trailer from retracting the jack components a unidirectional brake is incorporated into the jack which is effective to prevent self operation of the jack due to the weight of the trailer acting thereon, yet does not interfere with the extension of the jack. By the use of the brake mechanism the size of the electric drive motor may be minimized and the electrical requirements are maintained within acceptable ranges.

BRIEF DESCRIPTION OF THE DRAWINGS

The aforementioned objects and advantages of the invention will be apparent from the following description and accompanying drawings wherein:

FIG. 2 is an elevational, partially sectioned, view of jack structure in accord with the invention illustrating the jack components in the fully retracted position, FIG. 3 is a top plan view of the jack, FIG. 4 is a bottom view of the jack, the mounting plate being eliminated for purpose of illustration, FIG. 5 is a sectional view illustrating the speed-reduction transmission and the torque-limiting clutch as taken along section V-V of FIG. 2.

DESCRIPTION OF THE PREFERRED EMBODIMENT

It will be appreciated that the electric jack of the invention may be used in other applications than with recreational vehicle trailers. However, the jack will be described in this particular environment with the understanding that the structure described and claimed may be used in any application within the realm of one skilled in the art.

Figure 1:
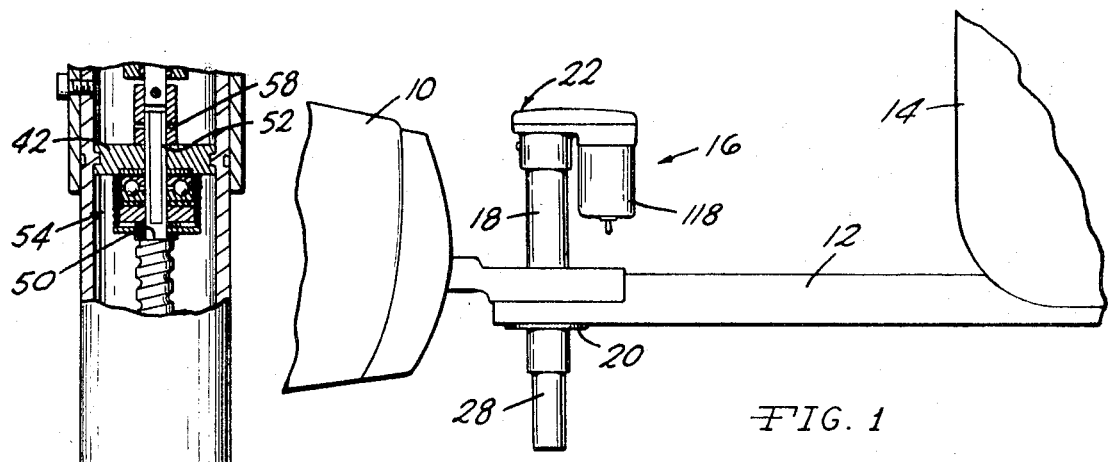
FIG. 1 is an elevational, detail view of a typical installation incorporating the electric jack of the invention partially illustrating a towing vehicle and the trailer and tongue with which the jack may be employed.

A typical installation for use of the jack with a recreational vehicle trailer is shown in FIG. 1. The towing vehicle is represented at 10, and would include a hitch for the trailer tongue 12 extending from the towed trailer 14. The jack is generally represented at 16, and extends in a vertical direction wherein upon extension the jack will engage the ground and raise and lower the trailer tongue with respect thereto. If desired, the lower portion of the jack could include a wheel or caster.

The arrangement of the jack components will be best appreciated from FIG. 2. The jack includes a cylindrical tubular support member 18 which is affixed to the trailer tongue by a mounting plate 20 which may be of a circular configuration concentrically related to the support member tube. The mounting plate 20 is affixed to the trailer tongue, such as at the underside, by bolts, not shown, wherein the assembly to the trailer tongue 12 will be as in FIG. 1.

The upper end of the support member tube 18 supports the motor transmission housing 22 which includes an annular collar 24 adapted to fit over and embrace the upper end of the support member and is attached thereto by means of a setscrew 26, FIG. 2. The transmission housing 22, and its associated structure, will be subsequently more fully described.

The support member tube 18 telescopically receives a cylindrical column 28 which is of a tubular form having a lower end receiving a plug 30, and an upper end to which the annular cap 32 is affixed. The cap 32 is provided with a threaded bore for receiving an antifriction nut 34. The nut includes a plurality of ball bearings movable in a raceway which includes a transfer tube 36. This type of antifriction nut is well known, and any conventional type of antifriction nut may be employed.

The support member tube 18 includes an indentation 38, FIG. 2, which is received within the longitudinally extending key groove 40 defined in the column 28. In this manner the column 28 may be longitudinally adjusted with respect to the support member 18, but is retained against relative rotation thereto.

The upper end of the support member tube 18 includes a circular plate 42 affixed therein and axially spaced from the upper end by means of swagging wherein the plate is able to resist high axial forces. The plate 42 is provided with a central bore through which the upper end of the threaded shaft 44 extends.

The threaded shaft 44 is formed with a thread capable of engaging with the balls of the antifriction nut 34 and the lower end of the shaft is provided with threads for receiving the nut 46 and the abutment washers 48. The upper end of the threaded shaft 44 is formed with a thrust shoulder 50, and a reduced portion 52 which extends through the friction brake assembly 54 and the bore of the plate 42. An adapter 56 is fixed to the upper end of the shaft 44 by means of pin 58 extending through the adapted and the shaft.

Figures 6, 7, 8:
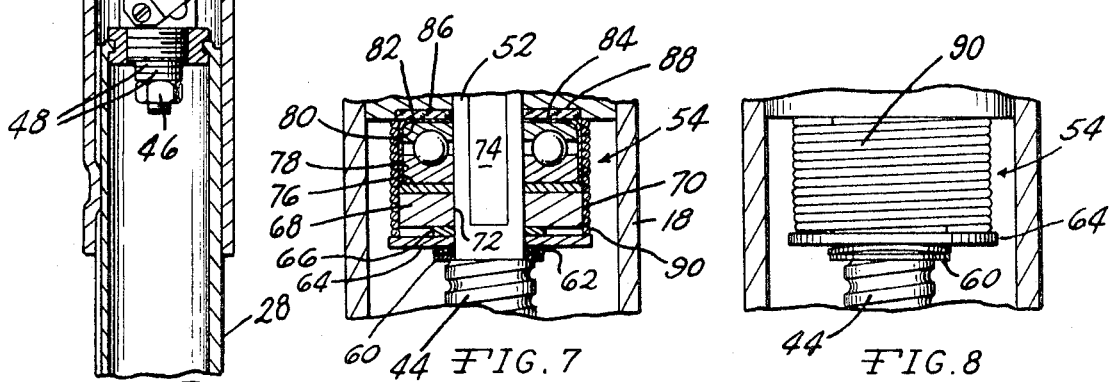
FIG. 6 is an elevational, partly sectioned, detail view of the jack components illustrated in the fully extended position.
FIG. 7 is an enlarged, detail, diametrical sectional view of the unidirectional brake assembly.
FIG. 8 is an elevational, enlarged, detail view of the brake assembly.

The brake assembly 54 is best shown in FIGS. 7 and 8, and includes a washer 60 engaging shoulder 50 which bears upon a spring washer 60 engaging a plate 64, and washer 66 is disposed upon the opposite side of the plate 64 for engagement with a cylindrical drum element 68. The drum element 68 is formed with a cylindrical outer surface 70, and is provided with a noncircular bore 72 for close cooperation with a flat 74 defined on the cylindrical shaft portion 52. Thus, the drum 68 is keyed to the shaft 44 for rotation therewith.

A spacer washer 76 is disposed between the drum 68 and the antifriction thrust bearing 78. The thrust bearing directly engages a cup-shaped drum 80 having a cylindrical portion defining an outer cylindrical surface 82 which axially encompasses the thrust bearing, and a radially extending portion 84 is interposed between the thrust bearing 78 and a friction material 86, such as cork, or the like, bonded in an annular recess 88 defined on the lower side of the plate.

A helical spring 90, FIG. 8, is disposed about the brake assembly 54 having an axial length corresponding to the axial length of the drum element 68 and the thrust bearing 78. The internal diameter of the spring 90 is such as to embrace the outer surface 70 of the drum 68 and the surface 82 of the cup-shaped drum 80, which are of substantially equal diameter. The direction of helix of the spring 90 is such that when the shaft 44 is rotated in the direction which causes the column 28 to extend from the support member 18, the frictional engagement between the drum 68 and the spring 90 tends to unwind or "open" the spring and thus release the spring with respect to the drum 80. Thus, as the shaft 44 is rotating to raise the trailer tongue, the brake assembly will be imposing little or no frictional resistance to shaft rotation.

When the shaft 44 is rotating in a direction which retracts the column 28 into the support member 18, such as when the jack is lowering the tongue 12, the engagement of the drum 68 with the spring 90 tends to wind the spring causing the spring to embrace the drum 80. The engagement of the spring with the drum surface 82 will cause the drum 80 to rotate against the frictional engagement thereof with the friction material 86 defined on the plate 42. Thus, as the shaft 44 is rotating in a direction which is augmented by the weight imposed upon the jack the brake assembly 54 will be effective. The brake assembly, in addition to preventing the jack from "lowering" too rapidly, also will prevent the shaft from "free wheeling" under the weight imposed thereon. Thus, as soon as the motor is stopped, the jack will maintain the desired height.

It will be noted that the axial force at the thrust bearing 78 maintains the drum portion 84 in engagement with the friction material 86 and the frictional engagement between the drum 80 and the material 86 will be determined by the axial forces imposed upon the column 28. The greater the axial force on the column, the greater the resistance to rotation of the drum 80, providing an automatic adjustment of the brake assembly in accordance with the axial force imposed on the jack components.

As will be appreciated in FIG. 2, the engagement of the nut 46 with the washer 60 constitutes the abutment which limits the maximum retraction of the column 28 into the support member 18.

The transmission housing 22 supports a vertically extending shaft 92 rotatably mounted within bearings as will be appreciated from FIG. 2. The shaft includes an enlarged portion 94, the upper half of which is of a cylindrical configuration rotatably supporting a gear 96. The lower half of the enlarged portion 94 includes a pair of flats 98, FIG. 5, and a three-armed detent member 100 having an internal bore including flats complimentary to the configuration of the shaft 92 is mounted upon the shaft for rotation therewith, and limited axial displacement thereto. The underside of the gear 96 includes three radially extending recesses 102, FIG. 5, disposed at 120° to each other for receiving the detent arms 104 of the member 100. The recesses 102 are beveled at their edges 106 to facilitate removal of the detent arms from the recesses under predetermined torque conditions. The detents are maintained within the gear recesses by means of a plurality of spring washers 108, such as of the Bellevue type, which are mounted upon the shaft 92 by washer 110 and a snap ring connection. Thus, the spring washers 108 will bias the detent arms 104 into the recesses 102 with a predetermined biasing force. Upon a predetermined torque existing between the shaft 92 and the gear 96 the beveled edges 106 of the recesses will tend to cam the detents from the recesses against the biasing force of the spring washers permitting the gear 96 to "slip" with respect to the shaft 92. This slippage will occur when the column 28 encounters the abutments defining either end of its range of travel.

The lower end of the shaft 92 includes a pin 111 which is received in the slots 113 defined in the threaded shaft adapter 56 whereby the shaft 92 is drivingly connected to the shaft 44.

An intermediary fiber gear 112 is rotatably mounted in the housing 22 having a large gear portion 114, and a small gear portion 116 which meshes with the gear 96. Access to the interior of the gear housing 22 is provided by the transmission housing cover 118 which is attached to the lower portion of the housing by screws 120, FIG. 3.

The underside of the transmission housing offset with respect to the collar 24 is also formed of an annular collar portion for receiving a cylindrical housing 122. The housing 122 houses the electric motor indicated at 124, and an electric switch 126 having an actuating lever 128 extending through the lower end of the housing. The electric motor 124 is of a reversible DC type, usually of 12 volts, and includes a drive shaft 130 having a pinion gear 132 defined thereon meshing with the gear portion 114.

The electric switch 126 is connected to the power source of the vehicle by conductors, not shown, and the switch is preferably of the momentary contact type such that the lever may be moved from an intermediary off position in opposite directions which reverses the polarity of the supply to the motor and thus reverses the direction of the motor. Movement of the switch lever 128 is one direction will cause the motor to rotate the shaft 44 to extend the column 28 from the support member 18 and thus raise the trailer tongue 12. Movement of the switch lever in the opposite direction will reverse the direction of rotation of the motor permitting the shaft 44 to retract the column into the support member and lower the tongue.

In use, it will be appreciated that it is only necessary for the operator to move the switch actuating lever 128 in the desired direction to cause the jack to raise or lower the trailer tongue. As soon as the switch is released it will resort to the off position and the brake assembly 54 will insure that the jack will retain the desired vertical adjustment. If the extension or retraction of the column 28 causes cap 32 to engage the abutment washers 48, or the nut 46 to engage the washer 60, the resultant high torque forces created between the gear 96 and the detent element 100 will cause arms 104 to cam out of the recesses 102 resulting in a chattering noise indicating to the operator to release the switch.

Figure 9:
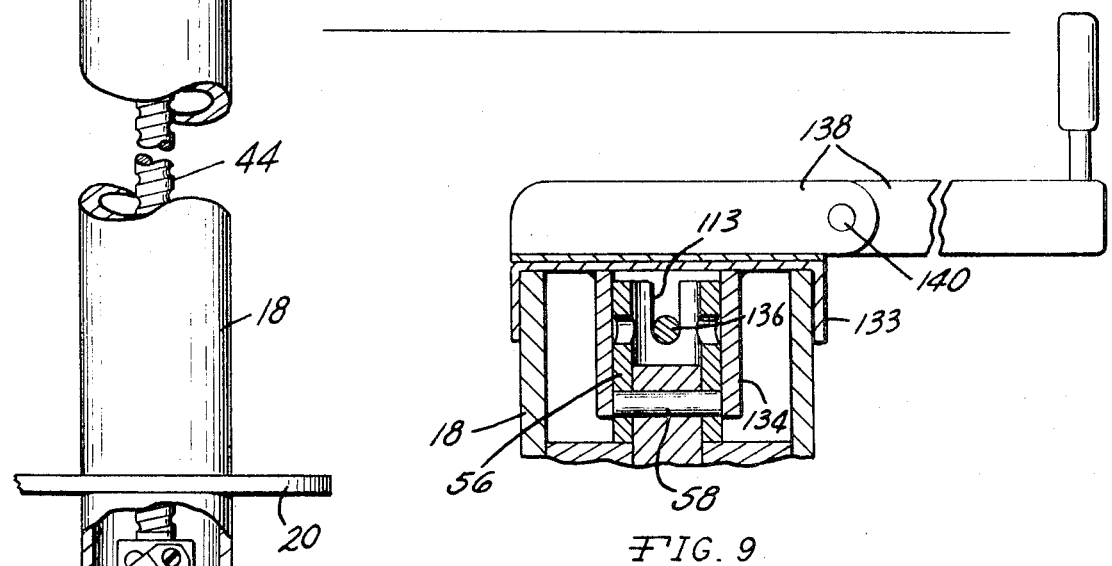
FIG. 9 is an enlarged, detail, sectional view of the upper end of the support member tube illustrating a manual auxiliary crank connected thereto.

In the event of an electric power failure, the jack may be operated manually. Manual operation is accomplished by removing the transmission housing 22 from the upper end of the support member 18 by removing the setscrew 26. Thereupon, a manual crank device may be attached to the upper end of the support member. An example of one type of manual cranking device which may be used is shown in FIG. 9. The manual crank apparatus illustrated includes a cuplike member 133 which may be disposed over the upper end of the support member 18, and includes on its underside a cylindrical sleeve 134 which may be slipped over the adapter 56 defined on the upper end of the shaft 44. The sleeve includes a pin 136 which is received within the drive slots 113 of the adapter, and this drive slot is the same drive slot which receives the drive pin 111 of the transmission shaft 92. A handle member 138, which may be a foldable two-part arrangement hinging about hinge pin 140, is attached to the member 133 permitting the member to be rotated and thus manually rotate the shaft 44 to operate the jack under emergency conditions.

It is appreciated that various modifications may be apparent to those skilled in the art without departing from the spirit and scope thereof and it is intended that the invention be defined only by the following claims.

We claim:

1. An electrically powered jack comprising, in combination, a support member adapted to be affixed to the member to be lifted, an elongated vertically oriented extensible column mounted on said support member having upper and lower ends, bearing means defined upon said support member supporting said column thereon for relative movement therebetween in the longitudinal direction of said column, a vertically oriented threaded shaft rotatably mounted upon said support member, thread means defined on said column meshing with the threads defined on said threaded shaft whereby said column is displaced relative to said support member upon rotation of said shaft, a reversible electric motor mounted upon said support member, speed-reduction transmission means drivingly connecting said motor to said threaded shaft for rotating said shaft, first and second abutment means defined on said shaft engageable with said column determining the limits of movement of said column, torque-limiting means defined in said transmission means limiting the degree of torque transmitted from said motor to said shaft, and an electric switch controlling energization of said motor.

2. In an electrically powered jack as in claim 1, a unidirectional brake connected to said shaft resisting rotation of said shaft when said shaft is rotated in a column retracting direction.

3. In an electrically powered jack as in claim 2 wherein said unidirectional brake includes a first drum member having a cylindrical surface fixed to said shaft concentric therewith, a second drum member having a cylindrical surface frictionally connected to said support member concentric to said shaft, and a helical spring wrapped upon said surfaces of said first and second drums.

4. In an electrically powered jack as in claim 3 wherein said bearing means includes a thrust bearing, a friction pad defined on said support member concentric to said shaft and in opposed relation to said thrust bearing, said second drum being rotatably mounted and having a portion interposed between said friction pad and said thrust bearing whereby axial thrust forces imposed on said shaft and bearing determine the degree of frictional interconnection between said second drum and said support member.

5. In an electrically powered jack as in claim 1 wherein said support member comprises a vertically oriented tube having upper and lower ends, a mounting flange mounted on said tube, said column being telescopically received within said tube, and a housing removably attached to said tube upper end, said electric motor and speed-reduction transmission means being mounted on said housing.

6. In an electrically powered jack as in claim 5, said threaded shaft being located within said support member tube and said column and including an upper end disposed adjacent said tube upper end, and a key adapter fixed to said shaft upper end for engagement with said transmission means.

7. In an electrically powered jack as in claim 5 wherein said column comprises a tube keyed to said support member tube, a cap fixed to said column tube upper end, said thread member comprising an antifriction nut affixed to said cap.

8. In an electrically powered jack as in claim 7 wherein said shaft includes a lower end, said first abutment means being defined on said shaft lower end and engaging said cap upon said column tube being extended its maximum degree, said second abutment being defined adjacent said shaft upper end for engagement by said nut upon said column tube being retracted its maximum degree.